US012686289B2

(12) United States Patent
Kuss et al.

(10) Patent No.: US 12,686,289 B2
(45) Date of Patent: Jul. 21, 2026

(54) MATERIAL HANDLING VEHICLE CHARGING SYSTEMS AND METHODS WITH POSITION COMPENSATION

(71) Applicant: The Raymond Corporation, Greene, NY (US)

(72) Inventors: Jeffrey J. Kuss, Binghamton, NY (US); Curtis D. Richards, Greene, NY (US)

(73) Assignee: The Raymond Corporation, Greene, NY (US)

( * ) Notice: Subject to any disclaimer, the term of this patent is extended or adjusted under 35 U.S.C. 154(b) by 863 days.

(21) Appl. No.: 17/982,285

(22) Filed: Nov. 7, 2022

(65) Prior Publication Data

US 2023/0142826 A1      May 11, 2023

Related U.S. Application Data

(60) Provisional application No. 63/277,434, filed on Nov. 9, 2021.

(51) Int. Cl.
| | |
|---|---|
| *B60L 53/37* | (2019.01) |
| *B60L 53/12* | (2019.01) |
| *B60L 53/30* | (2019.01) |

(52) U.S. Cl.
CPC .............. B60L 53/37 (2019.02); B60L 53/12 (2019.02); B60L 53/305 (2019.02); B60L 2200/40 (2013.01)

(58) Field of Classification Search
CPC ...................................................... B60L 53/37
USPC ....................................................... 320/109
See application file for complete search history.

(56) References Cited

U.S. PATENT DOCUMENTS

| | | | | |
|---|---|---|---|---|
| 5,498,948 | A | 3/1996 | Bruni et al. | |
| 5,646,500 | A | 7/1997 | Wilson | |
| 5,821,731 | A | 10/1998 | Kuki et al. | |
| 6,157,162 | A * | 12/2000 | Hayashi | H02J 7/0042 |
| | | | | 320/104 |
| 7,999,506 | B1 * | 8/2011 | Hollar | B60L 53/34 |
| | | | | 320/109 |
| 10,071,644 | B2 | 9/2018 | Wechsler et al. | |
| 10,336,204 | B2 | 7/2019 | Chabaan | |

(Continued)

FOREIGN PATENT DOCUMENTS

WO          2021155345 A1      8/2021

OTHER PUBLICATIONS

European Patent Office, Extended Search Report, Application No. 22206430.5, Mar. 24, 2023, 8 pages.

*Primary Examiner* — Jerry D Robbins
(74) *Attorney, Agent, or Firm* — Quarles & Brady LLP

(57)          ABSTRACT

A charging device for charging a battery of a material handling vehicle includes a stand having a stationary portion, a moveable portion that moves relative to the stationary portion, and one or more actuators to move the moveable portion. A charging plate and a sensing array can be supported on the moveable portion. The sensing array detects a position of the charging plate relative to a collector plate of the material handling vehicle. The sensing array includes a first sensor to detect a first position of the charging plate along a first direction and a second sensor to detect a first position of the charging plate along a second direction. Based on signal from the sensing array, a position controller operates the one or more actuators to move the moveable portion to align the charging plate with the collector plate for charging.

19 Claims, 7 Drawing Sheets

(56) References Cited

U.S. PATENT DOCUMENTS

| | | | | |
|---|---|---|---|---|
| 10,543,753 | B2 | 1/2020 | Wechsler et al. | |
| 10,604,021 | B2 | 3/2020 | Brown | |
| 10,744,881 | B2 | 8/2020 | Gamsjager | |
| 12,139,030 | B1 * | 11/2024 | Booth | B60L 53/36 |
| 2012/0140224 | A1 * | 6/2012 | Switkes | G01N 21/78 |
| | | | | 356/369 |
| 2014/0067660 | A1 * | 3/2014 | Cornish | B60L 53/35 |
| | | | | 705/39 |
| 2015/0061576 | A1 * | 3/2015 | Chen | B60L 53/31 |
| | | | | 320/108 |
| 2015/0139761 | A1 * | 5/2015 | Qi | E04H 6/42 |
| | | | | 414/253 |
| 2015/0210174 | A1 * | 7/2015 | Settele | B60L 53/35 |
| | | | | 320/109 |
| 2017/0008412 | A1 * | 1/2017 | Wu | B60L 53/65 |
| 2017/0136881 | A1 * | 5/2017 | Ricci | B60L 5/24 |
| 2017/0136885 | A1 * | 5/2017 | Ricci | B60L 53/126 |
| 2017/0136891 | A1 * | 5/2017 | Ricci | B60L 53/64 |
| 2017/0136892 | A1 * | 5/2017 | Ricci | H02J 50/10 |
| 2017/0182903 | A1 * | 6/2017 | Kwasnick | B60L 53/122 |
| 2017/0225583 | A1 * | 8/2017 | Chai | B60L 53/37 |
| 2019/0001832 | A1 * | 1/2019 | Schütz | B60L 53/37 |
| 2020/0016760 | A1 * | 1/2020 | Lee | B25J 9/1697 |
| 2020/0353833 | A1 * | 11/2020 | Kim | H02J 7/0045 |
| 2020/0361331 | A1 * | 11/2020 | Shin | H02J 7/0045 |
| 2021/0001736 | A1 * | 1/2021 | Schoob | B60L 53/37 |
| 2021/0094431 | A1 * | 4/2021 | Yang | H02J 7/0045 |
| 2021/0101496 | A1 * | 4/2021 | Brendel | B60L 53/37 |
| 2021/0237596 | A1 * | 8/2021 | Butina | B60L 53/66 |
| 2021/0331597 | A1 * | 10/2021 | Kamon | B25J 19/023 |
| 2022/0001761 | A1 * | 1/2022 | Cole | G06V 10/143 |
| 2022/0097544 | A1 * | 3/2022 | Tanaami | B60L 53/16 |
| 2022/0153157 | A1 * | 5/2022 | Nam | B60L 53/37 |
| 2022/0348097 | A1 * | 11/2022 | Garofalo | B60L 53/36 |

* cited by examiner

MATERIAL HANDLING VEHICLE CHARGING SYSTEMS AND METHODS WITH POSITION COMPENSATION

CROSS-REFERENCES TO RELATED APPLICATIONS

This application is based on and claims priority to U.S. Provisional Patent Application No. 63/277,434, filed on Nov. 9, 2021, which is incorporated herein by reference in its entirety.

STATEMENT REGARDING FEDERALLY SPONSORED RESEARCH

Not Applicable.

BACKGROUND

Material handling vehicles have been developed to transport goods loaded onto generally standardized transport platforms. For example, forklifts can be used to lift goods loaded onto a pallet and move the goods between locations in a facility such as a warehouse or a factory. Some material handling vehicles, such as automated guided vehicles (AGVs), can operate autonomously without a human operator. Other material handling vehicles are non-autonomous and are operated by a human. In any kind of material handling vehicle, systems and methods for improving operational efficiency are generally desired. For example, charging systems can be used to charge batteries in a variety of different material handling vehicles.

For certain types of vehicles there are training requirements imposed by various government agencies, laws, rules, and regulations. For example, the United States Department of Labor Occupational Safety and Health Administration (OSHA) imposes a duty on employers to train and supervise operators of various types of material handling vehicles. Recertification every three years is also required. In certain instances, refresher training in relevant topics shall be provided to the operator when required. In all instances, the operator remains in control of the material handling vehicle during performance of any actions. Further, a warehouse manager remains in control of the fleet of material handling vehicles within the warehouse environment. The training of operators and supervision to be provided by warehouse managers requires among other things proper operational practices including among other things that an operator remain in control of the material handling vehicle, pay attention to the operating environment, and always look in the direction of travel.

BRIEF SUMMARY

The present disclosure relates generally to systems and methods for positioning a charging plate relative to a collector plate of a material handling vehicle for charging (e.g., to align the charging plate with the collector plate). In some cases, the charging plate can be supported by a charging device with a position compensation system that can move the charging plate along one, two, three, or more directions to be in alignment with the collector plate, as may facilitate automatic charging of the material handling vehicle.

According to one aspect, the present disclosure provides a charging device for charging a battery of a material handling vehicle having a collector plate electrically coupled to the battery for charging. The charging device can include a stand having a stationary portion, a moveable portion that can move relative to the stationary portion, and one or more actuators can be configured to move the moveable portion of the stand relative to the stationary portion. A charging plate can be supported on the moveable portion for electrically coupling with the collector plate. A sensing array can be configured to detect a position of the charging plate relative to the collector plate. The sensing array can include a first sensor to detect a first position of the charging plate relative to the collector plate along a first direction and a second sensor to detect a first position of the charging plate relative to the collector plate along a second direction that can be different from the first direction. A position controller can be configured to receive a signal from the sensing array. Based on the signal, the position controller can operate the one or more actuators to move the moveable portion of the stand from a stored position in which the charging plate is not aligned with the collector plate to a charging position in which the charging plate is aligned with the collector plate for charging.

In some non-limiting examples, the first sensor can be a first retroreflective sensor that can be configured to detect a first reflective strip on the material handling vehicle and the second sensor can be a second retroreflective sensor that can be configured to detect a second reflective strip on the material handling vehicle. The position controller can be configured to operate the one or more actuators to move the moveable portion along the second direction to align the first retroreflective sensor with first reflective strip. The position controller can be configured to operate the one or more actuators to move the moveable portion along the first direction to align the second retroreflective sensor with the second reflective strip. The first direction can be perpendicular to the second direction. The first reflective strip can extend along the second direction and the second reflective strip can extend along the first direction.

In some non-limiting examples, the sensing array can be supported on the moveable portion of the stand and can further include a third sensor to detect a third position of the charging plate relative to the collector plate along a third direction. The third direction can be different from both the first direction and the second direction. The third sensor can be a position sensor that can be configured to determine a distance between the charging plate and the collector plate. The position controller can be configured to operate the one or more actuators to move the moveable portion along the third direction to align the charging plate with the collector plate. The third direction can be perpendicular to both the first direction and the second direction.

In some non-limiting examples, the charging device can further include a charge controller that can be configured to supply electrical current to the collector plate to wirelessly charge the battery via the collector plate. The charge controller can be configured to communicate with a battery management system of the material handling vehicle.

According to one aspect, the present disclosure provides a retrofit kit for charging a battery of a material handling vehicle. The retrofit kit can include a collector plate that can be configured to electrically couple to the battery and a support bracket that can be configured to couple to the material handling vehicle and to support the collector plate on the material handling vehicle. The retrofit kit can further include a first reflective strip and a second reflective strip that can be configured to be secured to the material handling vehicle, and a charging device. The charging device can include a stand having a stationary portion, a moveable portion that can be configured to move relative to the stationary portion, and one or more actuators that can be configured to move the moveable portion of the stand relative to the stationary portion. A charging plate and a sensing array can be configured to be supported on the moveable portion. The sensing array can be configured to detect a position of the charging plate relative to the collector plate. The sensing array can include a first retroreflective sensor to detect the first reflective strip to determine a first position of the charging plate relative to the collector plate along a first direction, and a second retroreflective sensor to detect the second reflective strip to determine a second position of the charging plate relative to the collector plate along a second direction. The second direction can be different from the first direction. A position controller can be configured to receive a signal from the sensing array. Based on the signal, the position controller can operate the one or more actuators to move the moveable portion of the stand from a stored position in which the charging plate is not aligned with the collector plate to a charging position in which the charging plate is aligned with the collector plate for charging.

In some non-limiting examples, the first direction can be perpendicular to the second direction. The first reflective strip can extend along the second direction and the second reflective strip can extend along the first direction. The position controller can be configured to operate a first actuator of the one or more actuators to move the moveable portion along the second direction to align the first retroreflective sensor with first reflective strip. The position controller can be configured to operate a second actuator of the one or more actuators to move the moveable portion along the first direction to align the second retroreflective sensor with the second reflective strip.

In some non-limiting examples, the sensing array can further include a third sensor to detect a third position of the charging plate relative to the collector plate along a third direction. The third direction can be different from both the first direction and the second direction. The third sensor can be a position sensor that can be configured to determine a distance between the charging plate and the collector plate. The position controller can be configured to operate a third actuator of the one or more actuators to move the moveable portion along the third direction to align the charging plate with the collector plate.

According to one aspect, the present disclosure provides a method for positioning a charging device for charging a battery of a material handling vehicle having a collector plate electrically coupled to the battery. The method can include, receiving, using a position controller, a first signal from a first retroreflective sensor. The first signal can indicate a first distance between a charging plate and the collector plate along a first direction. The first retroreflective sensor and the charging plate can be supported on a moveable portion of a stand that can be configured to be moved relative to a stationary portion of the stand. Using the position controller, a first actuator can be operated to move the moveable portion along the first direction to align the first retroreflective sensor with a first reflective strip supported on the material handling vehicle. The method can further include receiving, using the position controller, a second signal from a second retroreflective sensor. The second signal can indicate a second distance between the charging plate and the collector plate along a second direction. The second retroreflective sensor can be supported on the moveable portion. Using the position controller, a second actuator can be operated to move the moveable portion along the second direction to align the second retroreflective sensor with a second reflective strip supported on the material handling vehicle.

In some non-limiting examples, the method can further include receiving, using the position controller, a third signal from a position sensor. The third signal can indicate a third distance between the charging plate and the collector plate along a third direction. The position sensor can be supported on the moveable portion. Using the position controller, a third actuator can be operated to move the moveable portion along the third direction to move the collector plate to be at a predetermined distance from the collector plate for charging.

In some non-limiting examples, the method can further include receiving, using a charge controller, a fourth signal from a battery management system of the material handling vehicle. Based on the fourth signal, the charge controller can control a flow of electrical energy from the charging plate to the collector plate to charge the battery.

The foregoing and other aspects and advantages of the disclosure will appear from the following description. In the description, reference is made to the accompanying drawings, which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF THE DRAWINGS

The invention will be better understood and features, aspects and advantages other than those set forth above will become apparent when consideration is given to the following detailed description thereof. Such detailed description makes reference to the following drawings.

DETAILED DESCRIPTION

Figure 1:
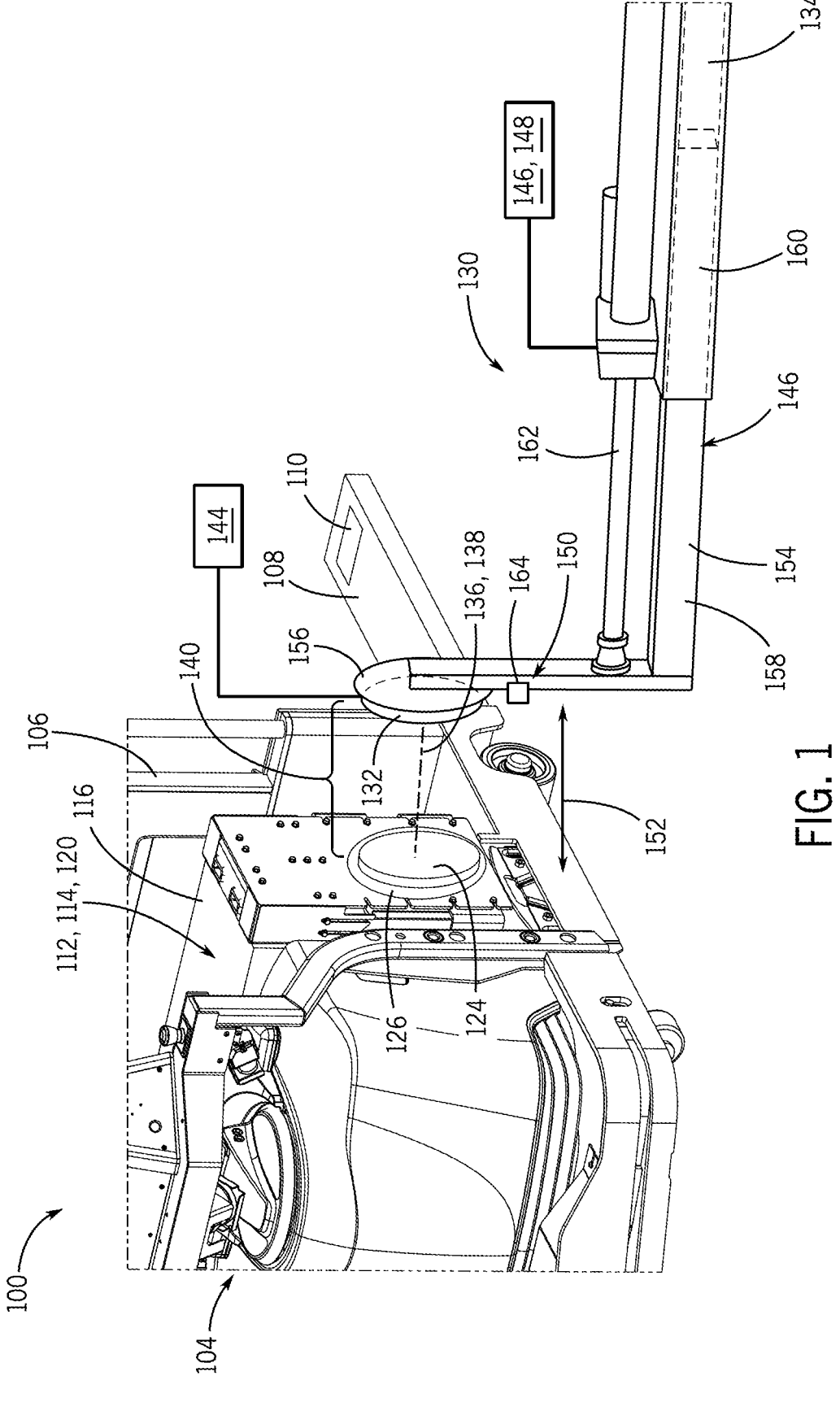
FIG. 1 is a partial schematic view of an automatic charging system for a material handling vehicle, according to aspects of the present disclosure.

Before any aspects of the present disclosure are explained in detail, it is to be understood that the present disclosure is not limited in its application to the details of construction and the arrangement of components set forth in the following description or illustrated in the following drawings. The invention is capable of other non-limiting examples and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof, as well as additional items. Likewise, "at least one of A, B, and C," and the like, is meant to indicate A, or B, or C, or any combination of A, B, and/or C. Unless specified or limited otherwise, the terms "mounted," "secured," "connected," "supported," and "coupled" and variations thereof are used broadly and encompass both direct and indirect mountings, connections, supports, and couplings. Further, "connected" and "coupled" are not restricted to physical or mechanical connections or couplings.

It is also to be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner.

It is also to be appreciated that material handling vehicles (MHVs) are designed in a variety of classes and configurations to perform a variety of tasks. It will be apparent to those of skill in the art that the present disclosure is not limited to any specific material handling vehicle, and can also be provided with various other types of material handling vehicle classes and configurations, including for example, lift trucks, forklift trucks, reach trucks, SWING REACH® vehicles, turret trucks, side loader trucks, counterbalanced lift trucks, pallet stacker trucks, order pickers, transtackers, tow tractors, and man-up trucks, and can be commonly found in warehouses, factories, shipping yards, and, generally, wherever pallets, large packages, or loads of goods can be required to be transported from place to place. The various systems and methods disclosed herein are suitable for any of operator controlled, pedestrian controlled, remotely controlled, and autonomously controlled material handling vehicles. Further, the various system and methods disclosed herein are suitable for other vehicles, such as automobiles, busses, trains, tractor-trailers, farm vehicles, factory vehicles, and the like.

Conventional systems for material handling vehicles, for example, forklifts, utilize batteries (e.g., lead-acid batteries (LABs) or lithium-ion batteries (LIBs) as an energy source, and must be periodically charged to continue operating. Charging of material handling vehicles can be carried out using a charging system. Conventional charging systems can be configured as manual chargers, wherein an operator manually connects a charger to a material handling vehicle, or as automatic chargers, wherein a material handling vehicle is moved or moves within close proximity to an automatic charger and the automatic charger then charges the material handling vehicle without further operator assistance or input.

For example, some automatic charging systems utilizes an immovable charging pad or base plate that is fixedly mounted to a stationary surface (e.g., a floor) and a collector plate that is mounted onto a material handling vehicle (e.g., to an underside of a material handling vehicle) so that it moves with the material handling vehicle relative to the base plate. To charge the material handling vehicle, the material handling vehicle is positioned, by either an operator, or an autonomous or semi-autonomous system, so that the collector plate is disposed above the base plate, such that the base plate and the collector plate are in alignment with one another. That is, so that a pair of signal pilot contacts and a pair of charging power contacts of the base plate are in contact with corresponding signal pilot contacts and charging power contacts of the collector plate. Generally, such charging systems demand accurate positioning of the collector plate with respect to the base plate (e.g., within 0.5 inches or less of a fully aligned position).

In some cases, it can be advantageous to have an automatic charging system that can accommodate greater misalignments between the automatic charger and the material handling vehicle. For example, such an automatic charging system may allow multiple sizes and/or types of material handling vehicles to use the same automatic charger. Similarly, such automatic charging systems can provide more efficient usability by tolerating greater amounts of misalignment. By allowing greater misalignment, a charging system can allow an autonomous material handling vehicle to be automatically charged even if it has a larger stopping tolerance. Similarly, such a charging system can allow a material handling vehicle that is carrying a load to be charged without first having to drop the load, only to have to re-engage the load after charging has completed.

Accordingly, some non-limiting examples of automatic charging systems according to the present disclosure can provide for an automatic charger that is able to accommodate comparatively large misalignments (i.e., tolerances) between an automatic charger and a material handling vehicle to be charged (e.g., up to 2 feet of misalignment, or more), in one or more directions. In this way, the automatic charging system can charge a material handling vehicle even where the material handling vehicle is carrying or towing a load that is larger than the material handling vehicle itself. Additionally, some non-limiting examples of automatic charging systems according to the present disclosure can accommodate for misalignments in one or more directions, for example, a front-to-back or extension direction, a side-to-side or lateral direction, and/or an up-and-down or vertical direction. Relatedly, such automatic charging systems can include a positioning system that can be configured to detect the relative position of a collector plate and a base plate, and to adjust a position of the collector plate or the base plate, or both, to position the collector plate and the base plate in alignment with one another.

FIG. 1 illustrates a non-limiting example of an automatic charging system 100 (e.g., a wireless automatic charging system) for charging an energy source of a material handling vehicle 104. The material handling vehicle 104 may be an automated guided vehicle (AGV), such as a fully- or semi-autonomous AGV, or a manually operated vehicle. The material handling vehicle 104 can include a mast 106 for raising and lowering a fork assembly 108 (or, in other non-limiting examples, a platform, an operator cabin, or other implement assemblies). That is, the mast 106 can be in the form of a telescoping mast with the fork assembly 108 attached thereto such that the fork assembly 108 can be selectively raised and lowered by the mast 106. The fork assembly 108 may include one or more forks 110 that can engage a load, for example, a pallet. In the present non-limiting example, the illustrated fork assembly 108 can include a pair of forks 110. In some non-limiting examples, the fork assembly 108 can be coupled to the mast 106 by a reach actuator.

The material handling vehicle 104 can further include an energy source 112 to power and/or operate various functions and systems of the material handling vehicle 104. In the illustrated non-limiting example, the energy source 112 is provided as a battery 114 (e.g., a LIB or LAB), however, other types of batteries and energy sources may also be used. In some non-limiting examples, a material handling vehicle 104 can accept several different kinds of energy systems or batteries 114. The battery 114 may include or be contained in a case 116. The case 116 may be a counterweight case that can be configured to support the battery 114.

The battery 114 may also include a battery management system (BMS) 120, configured to monitor a state-of-charge (SOC) of the battery 114, as well as monitoring and/or controlling charging and discharging of the battery 114. In particular, with regard to charging the battery 114, the BMS 120 can be configured to monitor or control the flow of electricity (i.e., electrical current) from a power receiving or collector plate 124, which is coupled with the material handling vehicle 104, to the battery 114. The collector plate 124 can be configured as an electrical contact plate with physical electrical contacts for wired charging, or as wireless charging plate with an induction coil to provide contactless charging (i.e., wireless charging).

In the illustrated non-limiting example, the collector plate 124 can be configured as a wireless charging coil that can be mounted to (i.e., coupled with) an exterior side of the material handling vehicle 104, although other mounting configurations are possible. For example, a collector plate 124 can be mounted to a different external surface of a material handling vehicle (e.g., a front, rear, top, or underside of a material handling vehicle), including any components thereof (e.g., the battery 114), or it can be internally mounted. Additionally, in some cases the collector plate 124 may include a base plate or bracket 126 that can be configured to couple with the material handling vehicle 104. Furthermore, the collector plate 124 is illustrated as being a circular plate, but it may alternately be any other shape.

The collector plate 124 can be configured to receive power from a charging device to charge an energy source of the material handling vehicle 104. For example, in the illustrated non-limiting example, the battery 114 of the material handling vehicle 104 can be charged by a charging device 130. The charging device 130 can be configured as an automatic charging device that can be connected to an external power source, such as an outlet or power mains (i.e., power is supplied to the charging device 130 via the power source). Additionally, the charging device 130 can be configured as a wireless charging device that can include a power delivery or charging plate 132. The charging plate 132 can be configured as a wireless charging coil that is supported by (i.e., coupled with) an adjustable charging base or stand 134. In the illustrated non-limiting example, the charging plate 132 is configured as a circular plate that is similar in size to the collector plate 124. In other non-limiting examples, the charging plate 132 can be configured to be another size and/or shape. Further, in other non-limiting examples, the charging plate 132 can be configured as an electrical contact plate with physical electrical contacts for wired charging.

To charge the battery 114 of the material handling vehicle 104, the BMS 120 can operate a communication link (e.g., a wireless communication link) between the battery 114 and the charging device 130 to control charging of the battery 114. More specifically, the BMS 120 may be in communication with a charge controller 144 of the charging device 130. In this regard, the BMS 120 can command the charging device 130 to handle all charging functions without operator input (e.g., selecting a charging voltage and charging current). That is, the BMS 120 may control the charging device 130, for example, by commanding the charge controller 144 to control a magnitude and/or direction of a current in the battery 114. In other non-limiting examples, the BMS 120 may communicate with the charging device 130 to begin charging the battery 114 and the charge controller 144 can control the charging of the battery 114 (e.g., to command the charge controller 144 to supply an electrical current from the charging plate 132 to the collector plate 124 to charge the battery 114).

To charge the battery 114, the collector plate 124 and the charging plate 132 should be generally aligned with one another. That is, in an ideal position, a central axis 136 of the collector plate 124 and a central axis 138 of the collector plate 124 can be coincident with one another. However, some deviation from the ideal position is permitted. For example, the automatic charging system 100 may be configured to tolerate up to 0.5 inches of misalignment (i.e., a parallel offset in a vertical or lateral direction) between the central axis 136 of the collector plate 124 and the central axis 138 of the charging plate. In addition, the collector plate 124 and the charging plate 132 may be spaced from each other by a gap 140. In the ideal position, the gap 140 can be approximately 0.5 inches, but may range between greater than or equal to 0.1 inches to less than or equal to 1.5 inches. In other non-limiting examples, a collector plate and a charging plate may instead have electrical contacts that physical contact therebetween to charge a material handling vehicle. In such non-limiting examples, no gap would be present between the charging plate and the collector plate when they are aligned.

To ensure alignment of a collector plate and a charging plate, a charging device can include a position compensation system. In the illustrated non-limiting example, the charging device 130 can include a position compensation system 146 having a position controller 148 that can control the position of the charging plate 132 to move the charging plate 132 into alignment with the collector plate 124. More specifically, as will be discussed in greater detail below, the stand 134 can include a moveable portion having various actuating structures and/or actuators that can be controlled (i.e., operated) by the position controller 148 to move the charging plate 132 into alignment with the collector plate 124, as are described in greater detail below. The moveable portion can be operatively supported on a stationary portion, such as a stand base, and can be moved relative to the stationary portion (e.g., via operation of one or more actuators). In some non-limiting examples, the stationary portion can be secured to a generally immovable structure, for example, a ground or floor surface, or a wall.

In addition, the position compensation system 146 can include a sensing array 150 in communication with the position controller 148, which may include, for example, one or more proximity sensors, retro-reflective sensors, visual cameras, 3D cameras, LIDAR, and/or other equivalent types of sensors as known in the art. In particular, the sensors of the sensing array 150 can be used to detect when the material handling vehicle 104 is in a charging area and/or the position of the collector plate 124 relative to the charging plate 132. The sensing array 150 can be supported by the charging device 130, the material handling vehicle 104, or another structure, and can be configured to send input signals to the position controller 148. That is, when the sensing array 150 detects that the material handling vehicle 104 is present, the sensing array 150 can send a corresponding signal to the position controller 148 to align the charging plate 132. In other non-limiting examples, a signal to align the charging plate 132 may be provided, for example, by a central automation server, a warehouse management system, or a manual push button.

Accordingly, in response to a signal to align the charging plate 132, the position controller 148 can operate the actuating structures via the actuators to move the charging plate 132 into alignment with the collector plate 124. During movement of the charging plate 132, the position controller 148 may receive additional input signals from the sensing array 150, which can be used to indicate a current position of the charging plate 132. In other non-limiting examples, one or both of the collector plate 124 and the charging plate 132 can be configured to move.

In the illustrated non-limiting example, the charging device 130 can be configured to move the charging plate 132 along an extension or first direction 152 extending between the stand 134 and the material handling vehicle 104 to adjust the gap 140 between the collector plate 124 and the charging plate 132. To facilitate movement along the first direction 152, the stand 134 can include an actuating structure, namely, an extension arm 154 (e.g., a moveable portion) that supports the charging plate 132 on a bracket 156, which can be coupled to a distal end of the extension arm 154.

In the illustrated non-limiting example, the extension arm 154 can be configured as a linear extension arm having an extension rod 158 that can be moveably received in a tube 160 (e.g., a stationary portion), which can be fixedly coupled with the ground or another non-moving structure (e.g., a wall or a girder). As illustrated, the extension rod 158 can be configured as an elongate member with a square cross-section and the tube 160 can be configured as a correspondingly shaped tube, although other configurations are possible. The extension rod 158, and thus the charging plate 132, can be moved relative to the tube 160 along the first direction 152 by an actuator 162. More specifically, the extension rod 158 can be moved between a stored position where the extension rod 158 is fully retracted into the tube 160 and a charging position where the extension rod 158 is moved by the actuator 162 to position the charging plate 132 in alignment with the collector plate 124. As illustrated, the actuator 162 can be configured as a hydraulic or electronic actuator that is operated by the position controller 148; however, other types of actuators may also be used (e.g., pneumatic actuators). In other non-limiting examples, other types and configurations of actuating structures and/or actuators may be used to move the charging plate along the first direction 152.

To ensure and determine when the gap 140 is within the permitted tolerance, the sensing array 150 can include a position sensor 164 that can be in communication with the position controller 148. The position sensor 164 can be configured to send position signals (i.e., position data) that are received and interpreted by the charge controller 144. For example, in the illustrated non-limiting example, the position sensor 164 can be configured as a proximity sensor that is mounted adjacent the charging plate 132, although other configurations and types of sensors (e.g., a laser measurement device) are possible. In response to the signals from the position sensor 164, the position controller 148 can operate the actuator 162 to move the charging plate 132 along the first direction 152 until the gap 140 is within a specified tolerance. Once alignment has been achieved, which may by indicated by a signal from the position sensor 164, the charging process can commence. Accordingly, the position controller 148 and the BMS 120 may communicate with one another that the collector plate 124 and the charging plate 132 are aligned, after which the BMS 120 can communicate with the charge controller 144 to begin charging the battery 114.

In other non-limiting examples, a position compensation system can be configured to move a charging plate in other directions. For example, a position compensation system may be configured to move a charging plate in a second, side-to-side or lateral direction that is oriented along a length or width of the material handling vehicle 104 (e.g., a direction parallel and along the forks). Alternatively or additionally, a position compensation system may be configured to move a charging plate in a third or vertical direction corresponding with a height of the material handling vehicle and/or a distance from the ground. Accordingly, in other non-limiting examples, a sensor array can include additional sensors to determine alignment along a second and/or third direction.

Figure 2:
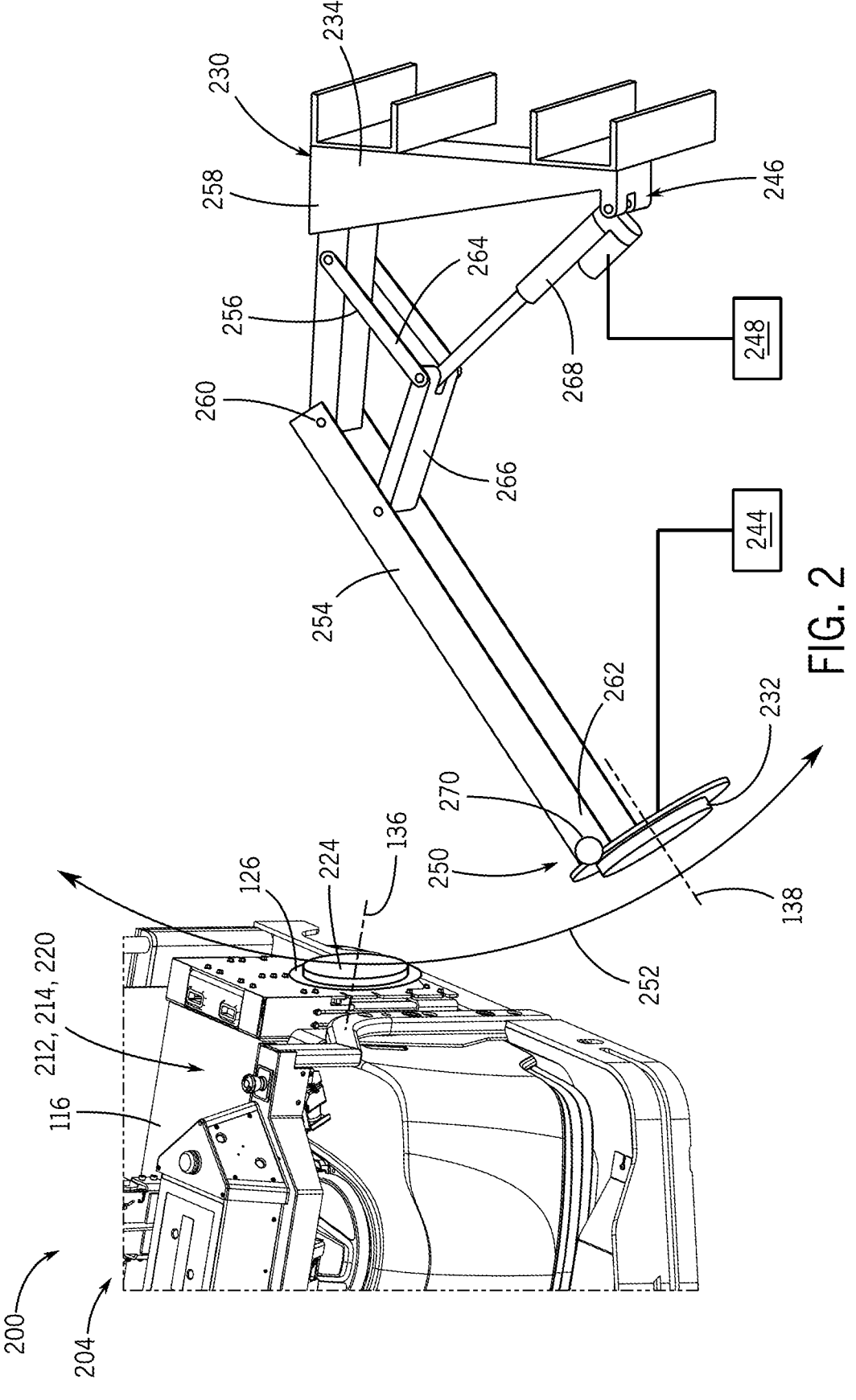
FIG. 2 is a partial schematic view of another automatic charging system for a material handling vehicle, according to aspects of the present disclosure.

Turning to FIG. 2, another non-limiting example of an automatic charging system 200 is illustrated. The automatic charging system 200 is similar to the automatic charging system 100, with like reference numeral referring to like features, except where otherwise indicated. In particular, the automatic charging system 200 can include a material handling vehicle 204 having an energy source 212 configured as a battery 214 and a BMS 220, which can be configured to control the charging of (i.e., controlling the flow of current to) the battery 214 via a collector plate 224 that can be coupled to the material handling vehicle 204. More specifically, collector plate 224 can be configured to receive power from a charging device 230 having a corresponding charging plate 232, which is mounted to an adjustable stand 234. That is, when the collector plate 224 and the charging device 230 are aligned, the BMS 220 can wirelessly communicate with a charge controller 244 of the charging device 230 to charge the battery 214 (e.g., to command the charge controller 244 to supply an electrical current from the charging plate 232 to the collector plate 224 to charge the battery 214).

To align the collector plate 224 and the charging plate 232, the BMS 220 can be further configured to communicate with a position compensation system 246. More specifically, the position compensation system 246 can include a position controller 248 that can communicate with the BMS 220, and, in response to input from a sensing array 250, detect the material handling vehicle 204 and move the charging plate 232 into alignment with the collector plate 224 via a number of actuating structures and/or actuators.

In the illustrated non-limiting example, the position compensation system 246 can be configured to move the charging plate 232 along an arcuate or curved path 252. In this way, the position compensation system 246 can adjust the position of the charging plate 232 along the curved path 252 to accommodate lateral misalignments along the curved path 252. Relatedly, the charging plate 232 can be moved along the curved path 252 between a stored position and a charging position. Such configurations may be beneficial, for example, where a charging device 230 is to be installed on a corner of a travel path for a material handling vehicle. In other non-limiting examples, position compensation system 246 can be configured to move the charging plate 232 along one or more additional directions.

To facilitate movement of the charging plate 232 along the curved path 252, the stand 234 can include an actuating structure, namely, a swing arm 254 (e.g., an extension arm or moveable portion) and a linkage 256 that are operatively coupled with a base 258 (e.g., a stationary portion) to rotate the swing arm 254. More specifically, the swing arm 254 can be configured as an elongate member that can be pivotally coupled (e.g., at a pinned connection) with the base 258 at a first end 260 and that can be configured to support the charging plate 232 at a distal or second end 262. The linkage 256 includes a first link 264 and a second link 266 that are pivotally coupled with one another so that they can rotate relative to one another. In addition, the first link 264 and second link 266 are pivotally coupled with and rotate relative to the swing arm 254 and the base 258, respectively. Put another way, the swing arm 254, the linkage 256, and the base 258 can form a four-bar linkage to rotate the charging plate 232 about the base 258. In this way, the swing arm 254 can be rotated about its connection to the base 258 to move the charging plate 232 into alignment with the collector plate 224.

Furthermore, an actuator 268 can be operatively coupled between the base 258 and the linkage 256 to move the swing arm 254 relative to the base 258. In the illustrated non-limiting example, the actuator 268 is coupled with the linkage 256 proximate the pivoting connection between the first link 264 and the second link 266, although other configurations are possible, for example, coupling the actuator 268 along the first link 264. The actuator 268 can be a linear actuator as known in the art (e.g., a hydraulic, pneumatic, or electric actuator) and can be controlled or otherwise operated by the position controller 248. More specifically, the position controller 248 can receive input signals from a position sensor 270 (e.g., a proximity sensor or a laser measurement device) and use those signals to determine when the charging plate 232 in alignment with the collector plate 224.

Figure 3:
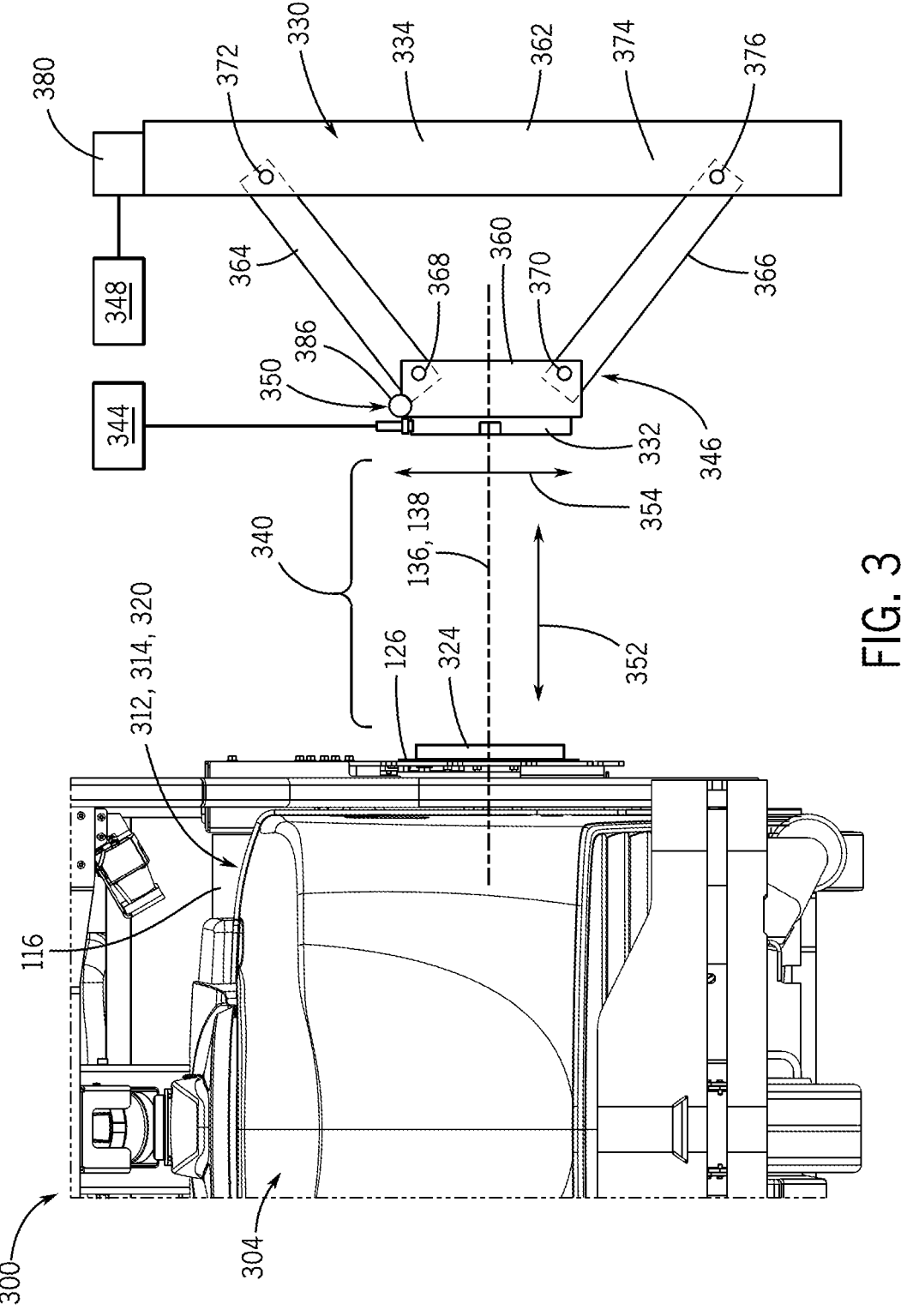
FIG. 3 is a partial schematic view of another automatic charging system for a material handling vehicle, according to aspects of the present disclosure.

Turning to FIG. 3, another non-limiting example of an automatic charging system 300 is illustrated. The automatic charging system 300 is similar to the automatic charging system 100, with like reference numeral referring to like features, except where otherwise indicated. In particular, the automatic charging system 300 can include a material handling vehicle 304 having an energy source 312 configured as a battery 314 and a BMS 320, which can be configured to control the charging of (i.e., controlling the flow of current to) the battery 314 via a collector plate 324 coupled to the material handling vehicle 304. More specifically, collector plate 324 can be configured to receive power from a charging device 330 having a corresponding charging plate 332, which can be mounted to an adjustable stand 334. That is, when the collector plate 324 and the charging device 330 are aligned, the BMS 320 can wirelessly communicate with a charge controller 344 of the charging device 330 to charge the battery 314.

To align the collector plate 324 and the charging plate 332, the BMS 320 can be further configured to communicate with a position compensation system 346. More specifically, the position compensation system 346 includes a position controller 348 that can communicate with the BMS 320, and, in response to input from a sensing array 350, detect the material handling vehicle 304 and move the charging plate 332 into alignment with the collector plate 324 via a number of actuating structures and/or actuators.

In the illustrated non-limiting example, the position compensation system 346 can be configured to move the charging plate 332 along one or more directions, namely, a first direction 352 and a second direction 354, to account for misalignments in two dimensions. The first direction 352 can be an extension direction that extends between the charging device 330 and the material handling vehicle 304, to adjust a gap 340 between the collector plate 324 and the charging plate 332. The second direction 354 can be a vertical direction to adjust a height of the charging plate 332 and generally is oriented perpendicular or normal to a ground surface, or corresponds with a height of the material handling vehicle 304. In other non-limiting examples, the position compensation system 346 may additionally or alternatively be configured to move the charging plate 332 in a third direction that is perpendicular to both the first direction 352 and the second direction 354 so that it extends along a length of the material handling vehicle 304.

To permit movement along the first direction 352 and the second direction 354, the stand 334 can include a bracket 360 that can be configured to support the charging plate 332. The bracket 360 can be operatively coupled with a base 362 (e.g., a stationary portion) by an upper or first arm 364 and a lower or second arm 366 (e.g., that collectively form an extension arm or movable portion with the bracket 360) to move relative to the base 362. In particular, the first arm 364 can be pivotally coupled to an upper end of the bracket 360 at a first bracket connection 368 (e.g., a pinned connection) and the second arm 366 can be pivotally coupled to a lower end of the bracket 360 at a second bracket connection 370 (e.g., a pinned connection). Additionally, the first arm 364 can be pivotally coupled to a first nut 372 (e.g., a threaded nut) that can be configured to engage a lead screw 374, which can be rotatably coupled with and at least partially disposed within the base 362, and the second arm 366 is pivotally coupled to a second nut 376 (e.g., a threaded nut) that can be configured to engage the lead screw 374. The lead screw 374 can be rotated by a motor 380 in response to a command from the position controller 348. By rotating the lead screw 374, the position of the bracket 360, and thus the charging plate 332, can be adjusted to place the charging plate 332 into alignment with the collector plate 324.

For example, the lead screw 374 can be configured so that when the lead screw 374 is rotated in a first direction, the engagement of the first nut 372 and the second nut 376 with the lead screw 374 can cause the bracket 360 and the charging plate 332 to move closer to (i.e., toward) the collector plate 324 along the first direction 352, reducing the gap 340 therebetween. Accordingly, when the lead screw 374 is rotated in an opposite direction, the bracket 360 and the charging plate 332 can be moved away from the collector plate 324 along the first direction 352, increasing the size of the gap 340 therebetween. In both cases, the rotation of the lead screw 374 can cause each of the first arm 364 and the second arm 366 to rotate about the first bracket connection 368 and the second bracket connection 370, respectively to move the charging plate 332 along the first direction 352.

Alternatively or additionally, the lead screw 374 can be configured so that when the lead screw 374 is rotated in a first direction, the engagement of the first nut 372 and the second nut 376 with the lead screw 374 can cause the bracket 360 and the charging plate 332 to move upward (i.e., away from the ground) along the second direction 354, so as to be in alignment with the collector plate 324. Accordingly, when the lead screw is rotated in an opposite direction, the bracket 360 and the charging plate 332 can be moved downward (i.e., toward the ground) along the second direction 354 to be in alignment with the collector plate 324. In other non-limiting examples, the first arm 364 and the second arm 366 can be actuated by other methods as known in the art, for example, linear actuators. In this way, each of the first arm 364 and the second arm 366 can also be actuated independently of one another.

To ensure alignment between the collector plate 324 and the charging plate 332, the sensing array 350 can include a position sensor 386 that can be in communication with the position controller 348. The position sensor 386 can be a proximity sensor that can be configured to send position signals or other types of signals to the position controller 348, although other types of sensors and configurations of sensors are possible. In response to the signals from the position sensor 386, the position controller 348 can operate the motor 380 to move the first arm 364 and the second arm 366 via the lead screw 374, and bring charging plate 332 into alignment with the collector plate 324.

Figure 4:
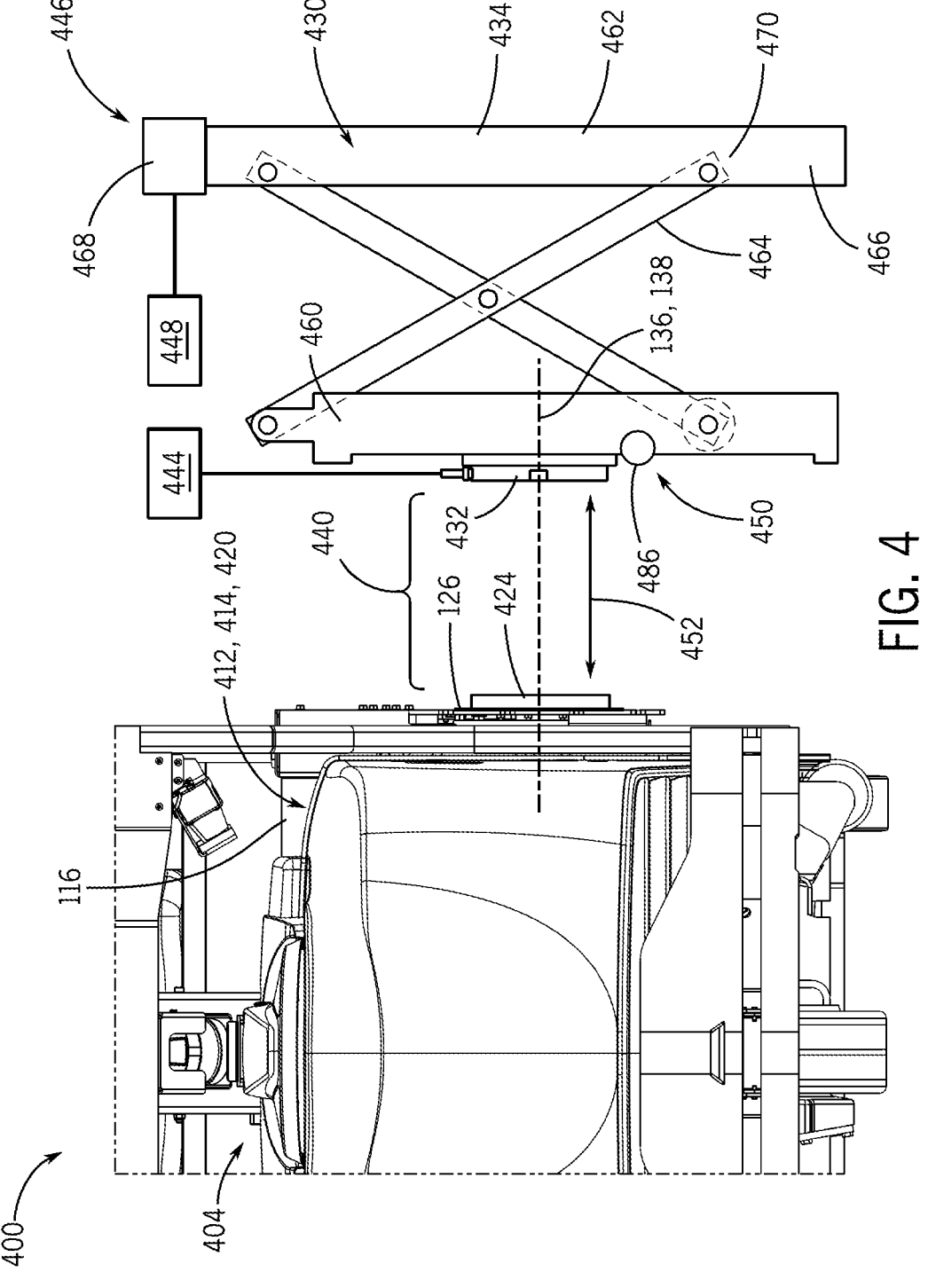
FIG. 4 is a partial schematic view of another automatic charging system for a material handling vehicle, according to aspects of the present disclosure.

With regard to FIG. 4, another non-limiting example of an automatic charging system 400 is illustrated. The automatic charging system 400 is similar to the automatic charging system 100, with like reference numeral referring to like features, except where otherwise indicated. In particular, the automatic charging system 400 can include a material handling vehicle 404 having an energy source 412 configured as a battery 414 and a BMS 420, which can be configured to control the charging of (i.e., controlling the flow of current to) the battery 414 via a collector plate 424 coupled to the material handling vehicle 404. More specifically, collector plate 424 can be configured to receive power from a charging device 430 having a corresponding charging plate 432, which can be mounted to an adjustable stand 434. That is, when the collector plate 424 and the charging device 430 are aligned, the BMS 420 can wirelessly communicate with a charge controller 444 of the charging device 430 to charge the battery 414.

To align the collector plate 424 and the charging plate 432, the BMS 420 can be further configured to communicate with a position compensation system 446. More specifically, the position compensation system 446 includes a position controller 448 that can communicate with the BMS 420, and, in response to input from a sensing array 450, detect the material handling vehicle 404 and move the charging plate 432 into alignment with the collector plate 424 via a number of actuating structures and/or actuators.

In the illustrated non-limiting example, the position compensation system 446 can be configured to move the charging plate 432 along an extension or first direction 452, which can extend between the charging device 430 and the material handling vehicle 404, to adjust a gap 440 between the collector plate 424 and the charging plate 432. To permit such movement along each of the first direction 452, the stand 434 can include a beam 460 that can be configured to moveably support the charging plate 432. The beam 460 can be operatively coupled to a base 462 (e.g., a stationary portion) via a pantograph 464, which can allow the beam 460, and thus the charging plate 432, to move relative to the base 462 along the first direction 452. In that regard, the pantograph 464 can act as an extension arm (e.g., a moveable portion) of the position compensation system 446.

More specifically, the base 462 includes a lead screw 466 that can be rotated by a motor 468, which can be controlled by the position controller 448, and the pantograph 464 includes a nut 470 that engages with the lead screw 466 to extend and contract the pantograph 464 along the first direction 452. Thus, for example, when the lead screw 466 is rotated in a first direction, the engagement of the nut 470 with the lead screw 466 causes the pantograph 464 to extend along the first direction 452 to move the charging plate 432 closer to the collector plate 424, thereby reducing the gap 440. Conversely, when the lead screw 466 is rotated in a second direction that is opposite the first direction, the engagement of the nut 470 with the lead screw 466 causes the pantograph 464 to contract along the first direction 452 to move the charging plate 432 away from the collector plate 424, thereby increasing the gap 440. In other non-limiting examples, the pantograph 464 can be actuated by other methods as known in the art, for example, a linear actuator.

To ensure alignment between the collector plate 424 and the charging plate 432, the sensing array 450 can include a position sensor 486 in communication with the position controller 448. The position sensor 486 can be configured as a proximity sensor, which can send position signals or other types of signals to the position controller 448, although other types of sensors can also be used. In response to the signals from the position sensor 486, the position controller 448 can operate the motor 468 to extend and/or retract the pantograph 464, thereby bringing the charging plate 432 into alignment with the collector plate 424.

Figure 5:
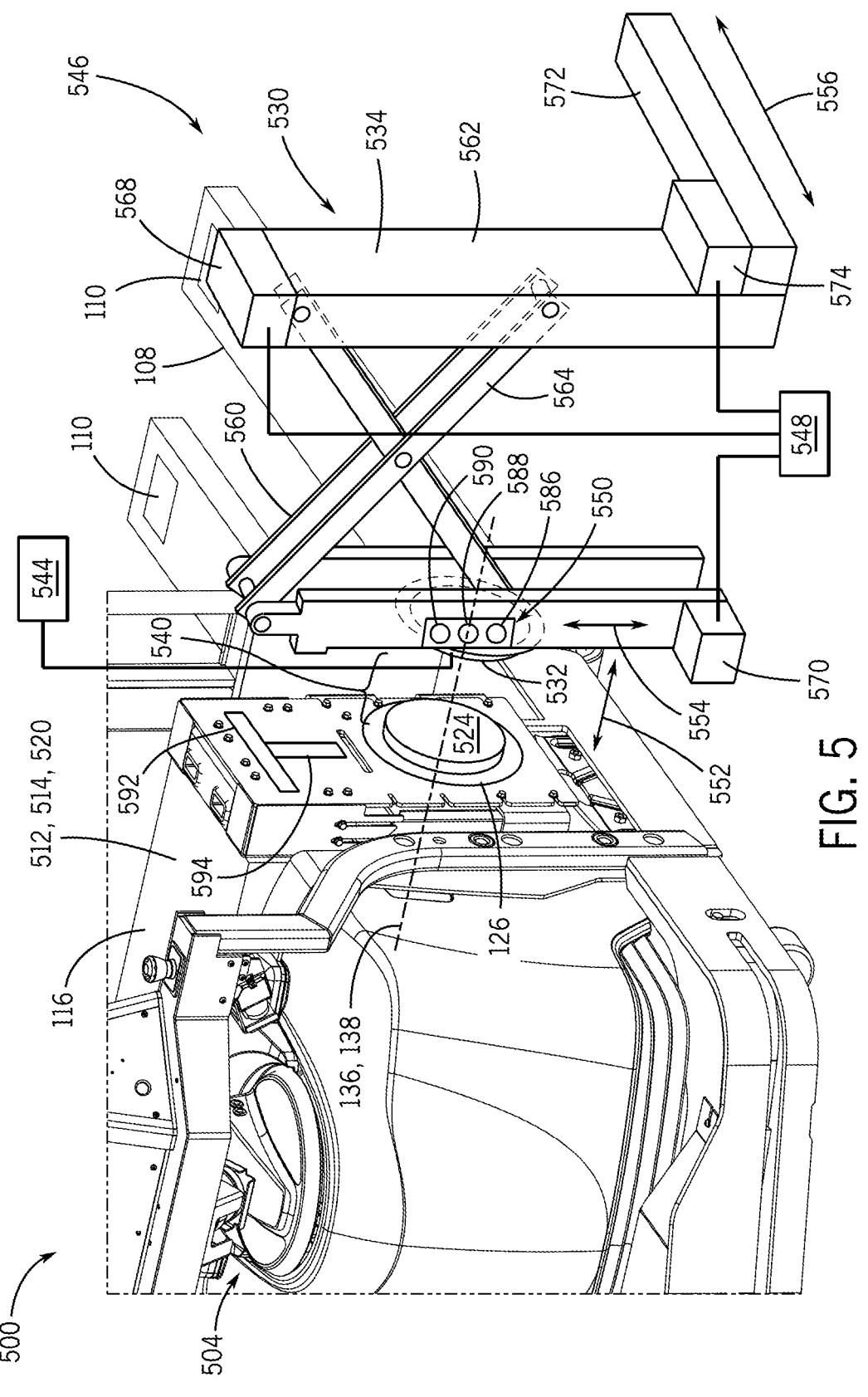
FIG. 5 is a partial schematic view of another automatic charging system for a material handling vehicle, according to aspects of the present disclosure.

Turning to FIG. 5, another non-limiting example of an automatic charging system 500 is illustrated. The automatic charging system 500 is similar to the automatic charging system 400, with like reference numeral referring to like features, but includes additional structures to allow for movement of a charging pad along three directions. In particular, the automatic charging system 500 can include a material handling vehicle 504 having an energy source 512 configured as a battery 514 and a BMS 520, which can be configured to control the charging of (i.e., controlling the flow of current to) the battery 514 via a collector plate 524 coupled to the material handling vehicle 504. More specifically, collector plate 524 can be configured to wirelessly receive power from a charging device 530 having a corresponding charging plate 532, which is mounted to an adjustable stand 534. That is, when the collector plate 524 and the charging device 530 are aligned, the BMS 520 can wirelessly communicate with a charge controller 544 of the charging device 530 to charge the battery 514.

To align the collector plate 524 and the charging plate 532, the BMS 520 can also communicate with a position compensation system 546. More specifically, the position compensation system 546 includes a position controller 548 that can communicate with the BMS 520, and, in response to input from a sensing array 550, detect the material handling vehicle 504 and move the charging plate 532 into alignment with the collector plate 524 via a number of actuating structures and/or actuators.

In the illustrated non-limiting example, the position compensation system 546 can be configured to move the charging plate 532 along three directions, namely, a first direction 552, a second direction 554, and a third direction 556 to account for misalignments in three dimensions. The first direction 552 can be an extension direction that extends between the charging device 530 and the material handling vehicle 504, to adjust the gap 540 between the collector plate 524 and the charging plate 532. The second direction 554 can be a vertical direction to adjust a height of the charging plate 532 relative to the ground and generally corresponds with a height of the material handling vehicle 504. The third direction 556 can be a lateral direction that extends perpendicular to both the first direction 552 and the second direction 554 so that it extends along a length of the material handling vehicle 504.

Similar to the automatic charging system 400, the charging plate 532 can be supported by a beam 560 that is moveably coupled to a base 562 by a pantograph 564 (e.g., an extension arm or moveable portion). The position controller 548 can operate a first motor 568 to move the beam 560 and the charging plate 532 along the first direction 552 to adjust the gap 540. However, in the illustrated non-limiting example, the charging plate 532 can also be moveably coupled with the beam 560 to allow the charging plate 532 to move along the second direction 554. More specifically, the position controller 548 can operate a second motor 570 to move the charging plate 532 along the second direction 554. Additionally, the base 562 is moveably coupled with a rail 572 (e.g., a stationary portion) to allow the base 562, and therefore the pantograph 564, the beam 560, and the charging plate 532 to move together along the third direction 556. The rail 572 can be fixedly coupled to the ground or another stationary structure. Thus, to move the charging plate 532 along the third direction 556, the position controller 548 can operate a third motor 574 to move the base 562, the pantograph 564, the beam 560, and the charging plate 532 together along the third direction 556.

To ensure alignment between the collector plate 524 and the charging plate 532, the sensing array 550 can include a first position sensor 586, a second position sensor 588, and a third position sensor 590 that are each in communication with the position controller 548. The sensing array 550, or a portion thereof (e.g., the third position sensor 590) can be coupled to move with the charging plate 532. The first position sensor 586 can be configured as a proximity sensor to monitor the position of (i.e., align) the charging plate 532 along the first direction 552. For example, the first position sensor 586 can be configured to measure a distance to the material handling vehicle 104 (i.e., a reflective surface of the material handling vehicle 104). This measured distance can be used by the position controller 548 to control movement of the charging plate 532 perpendicularly to the material handling vehicle 104 (i.e., along the first direction 552). The second position sensor 588 can be a retroreflective sensor that can be configured to detect a first reflective strip 592 on the material handling vehicle 504 to align the charging plate 532 along the second direction 554. The third position sensor 590 can be a retroreflective sensor that can be configured to detect a second reflective strip 594 on the material handling vehicle 504 to align the charging plate 532 along the third direction 556.

As illustrated, the first reflective strip 592 can be oriented along the third direction 556 so that the second position sensor 588 can detect the first reflective strip 592 no matter its relative position along the third direction 556. Similarly, the second reflective strip 594 can be oriented along the second direction 554 so that the third position sensor 590 can detect the second reflective strip 594 no matter its relative position along the second direction 554. Additionally, the first reflective strip 592 and the second reflective strip 594 can be a known distance from the collector plate 524 to allow the position controller 548 to determine where to position the charging plate 532 so that it is aligned with the collector plate 524.

Figure 6:
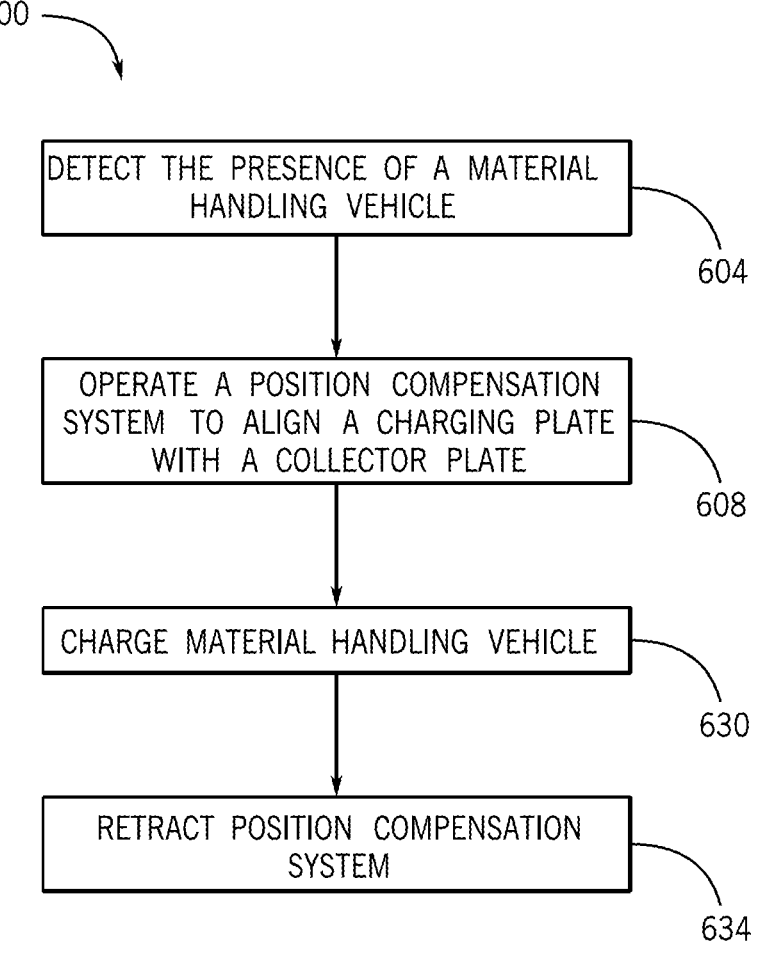
FIG. 6 is a flowchart of a method of positioning an automatic charging system, according to aspects of the present disclosure.

With additional reference to FIG. 6, a method 600 for operating the position compensation system 546 to move the charging plate 532 into alignment with the collector plate 524 is illustrated. While the method 600 is described in relation to the automatic charging system 500, it will be appreciated by those skilled in the art that such a method can be modified to apply to other non-limiting example charging systems according to the present disclosure. The method 600 may start at step 604, where the sensing array 550 can detect the presence of the material handling vehicle 504 within a charging area. More specifically, the first position sensor 586 can detect the presence of the material handling vehicle 504 and send a corresponding signal to the position controller 548. In other non-limiting examples, such a signal can be provided or sent by another means, for example, a central automation server or a push button. It is appreciated that the position compensation system 546 can be in a stored configuration.

Figures 7, 8:
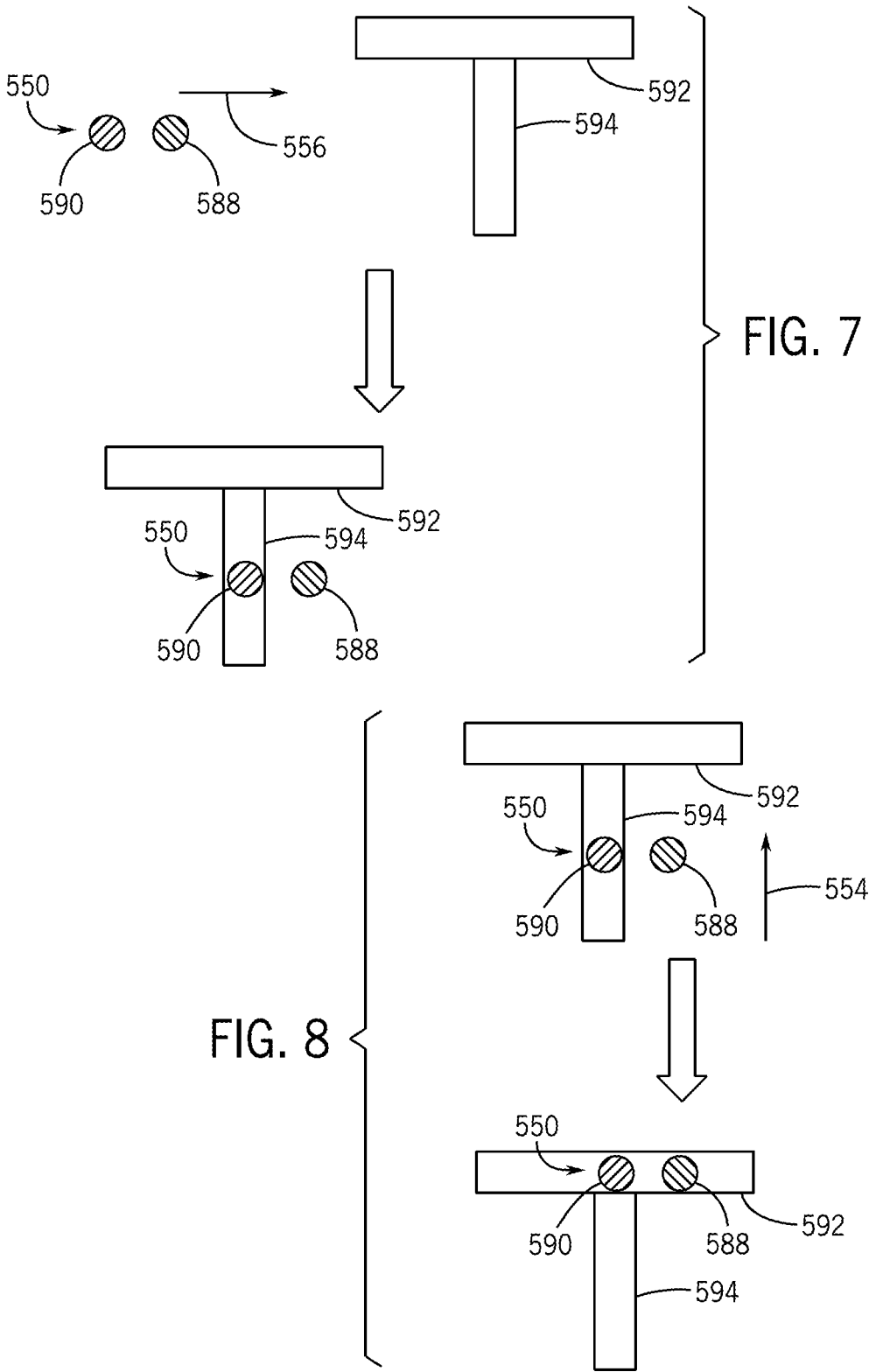
FIG. 7 is a schematic view of a method of positioning an automatic charging system of FIG. 6, being implemented by the automatic charging system of FIG. 5, according to aspects of the present disclosure.
FIG. 8 is an additional schematic view of the method of positioning an automatic charging system of FIG. 6, being implemented by the automatic charging system of FIG. 5, according to aspects of the present disclosure.

At step 608, upon receiving the signal that the material handling vehicle 504 is present, the position controller 548 can position the charging plate 532 in alignment with the collector plate 524. The step 608 of aligning the charging plate 532 with the collector plate 524 can include operating any or all actuators and/or actuating structures of the position compensation system. For example, with specific reference to FIG. 7, the position controller 548 can operate the third motor 574 to move the charging plate 532 along the third direction 556 until the third position sensor 590 is aligned with and detects the second reflective strip 594. In this way, the charging plate 532 will be in alignment with the collector plate 524 along third direction 556. Additionally, with specific reference to FIG. 8, the position controller 548 can operate the second motor 570 to move the charging plate 532 along the second direction 554 until the second position sensor 588 is aligned with and detects the first reflective strip 592. In this way, the charging plate 532 will be in alignment with the collector plate 524 along second direction 554. Furthermore, the position controller 548 can operate the first motor 568 to extend the pantograph 564 and move the charging plate 532 along the first direction 552 until the first position sensor 586 indicates (i.e., sends a signal) that the gap 540 is within the specified tolerance. In this way, the charging plate 532 will be in alignment with the collector plate 524 along first direction 552.

In some cases, it may be preferable to adjust the position of the charging plate 532 along each of the first direction 552, the second direction 554, and the third direction 556 in series. For example, the position controller 548 can first adjust the position of the charging plate 532 along the third direction 556 followed by the second direction 554, and then the third direction 556. In other non-limiting examples, the position controller 548 can adjust the position of the charging plate 532 along each of the first direction 552, the second direction 554, and the third direction 556 in a different order. Additionally, the position controller 548 can adjust the position of the charging plate 532 along any of the first direction 552, the second direction 554, and the third direction 556 simultaneously. Moreover, in some cases, it may not be necessary to adjust the position of the charging plate 532 along all directions. For example, the position controller 548 may only adjust the position of the charging plate along the first direction 552, or along the first direction 552 and the third direction 556.

With continued reference to FIG. 6, once the charging plate 532 is aligned with the collector plate 524, the position controller 548 can communicate with one or both of the BMS 520 and the charge controller 544 to charge the battery 514 at step 630. Once charging has been completed, the position controller 548 can operate the position compensation system 546 to move the charging plate 532 back to a stored position at step 634.

In some cases, automatic charging systems, as described in accordance with the various non-limiting examples above can be provided as a retrofit kit. In general, such retrofit kits can be used for charging a battery of a material handling vehicle and can include, for example, a charging device (e.g., the charging device 130, 230, 330, 430, 530). Additionally, a retrofit kit can include a collector plate (e.g., the collector plate 124, 224, 324, 424, 524). Correspondingly, the retro fit kit may also include a bracket that can be configured to couple the collector plate to the material handling vehicle. Further still, the retrofit kit can include reflective strips or other reflective elements that can be coupled to the material handling vehicle, as may facilitate automatic alignment of the charging system using a retrore-flector sensor system in accordance with the description above.

For certain types of vehicles there are training require-ments imposed by various government agencies, laws, rules, and regulations. For example, OSHA imposes a duty on employers to train and supervise operators of various types of material handling vehicles. Recertification every three years is also required. In certain instances, refresher training in relevant topics shall be provided to the operator when required. In all instances, the operator remains in control of the material handling vehicle during performance of any actions. Further, a warehouse manager remains in control of the fleet of material handling vehicles within the warehouse environment. The training of operators and supervision to be provided by warehouse managers requires among other things proper operational practices including among other things that an operator remain in control of the material handling vehicle, pay attention to the operating environ-ment, and always look in the direction of travel.

Within this specification non-limiting examples have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein. Accordingly, aspects of some non-limiting examples may be equally applied or combined with aspects of other non-limiting examples.

Thus, while the invention has been described in connec-tion with particular embodiments and examples, the inven-tion is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publi-cation were individually incorporated by reference herein.

Various features and advantages of the invention are set forth in the following claims.

We claim:

1. A charging device for charging a battery of a material handling vehicle having a collector plate electrically coupled to the battery for charging, the charging device comprising:
    a stand having a stationary portion and a moveable portion that is configured to move relative to the stationary portion;
    one or more actuators configured to move the moveable portion of the stand relative to the stationary portion;
    a charging plate that is supported on the moveable por-tion;
    a sensing array configured to detect a position of the charging plate relative to the collector plate, the sensing array including:
        a first sensor to detect a first position of the charging plate relative to the collector plate along a first direction, and
        a second sensor to detect a first position of the charging plate relative to the collector plate along a second direction that is different from the first direction; and
    a position controller configured to receive a signal from the sensing array and, based on the signal, to operate the one or more actuators to move the moveable portion of the stand from a stored position in which the charging plate is not aligned with the collector plate to a charging position in which the charging plate is aligned with the collector plate for charging;
    wherein the first sensor is a first retroreflective sensor to detect a first reflective strip on the material handling vehicle and the second sensor is a second retroreflective sensor to detect a second reflective strip on the material handling vehicle.

2. The charging device of claim 1, wherein the first direction is perpendicular to the second direction, and
    wherein the first reflective strip extends along the second direction and the second reflective strip extends along the first direction.

3. The charging device of claim 2, wherein the position controller is configured to operate the one or more actuators to move the moveable portion along the second direction to align the first retroreflective sensor with first reflective strip and to move the moveable portion along the first direction to align the second retroreflective sensor with the second reflective strip.

4. The charging device of claim 1, wherein the sensing array further includes a third sensor to detect a third position of the charging plate relative to the collector plate along a third direction that is different from both the first direction and the second direction.

5. The charging device of claim 4, wherein the third sensor is a position sensor configured to determine a dis-tance between the charging plate and the collector plate.

6. The charging device of claim 4, wherein the position controller is configured to operate the one or more actuators to move the moveable portion along the third direction to align the charging plate with the collector plate.

7. The charging device of claim 4, wherein the third direction is perpendicular to both the first direction and the second direction.

8. The charging device of claim 1, further comprising a charge controller configured to supply electrical current to the collector plate to wirelessly charge the battery via the collector plate.

9. The charging device of claim 8, wherein the charge controller is configured to communicate with a battery management system of the material handling vehicle.

10. The charging device of claim 1, wherein the sensing array is supported on the moveable portion of the stand.

11. A retrofit kit for charging a battery of a material handling vehicle, the retrofit kit comprising:
    a collector plate configured to electrically couple to the battery;
    a support bracket configured to couple to the material handling vehicle and to support the collector plate on the material handling vehicle;
    a first reflective strip configured to be secured to the material handling vehicle;
    a second reflective strip configured to be secured to the material handling vehicle; and
    a charging device including:
        a stand having a stationary portion and a moveable portion that is configured to move relative to the stationary portion;
        one or more actuators configured to move the moveable portion of the stand relative to the stationary portion;
        a charging plate configured to be supported on the moveable portion; and
        a sensing array configured to be supported on the moveable portion to detect a position of the charging plate relative to the collector plate, the sensing array including:

a first retroreflective sensor to detect the first reflective strip to determine a first position of the charging plate relative to the collector plate along a first direction, and a second retroreflective sensor to detect the second reflective strip to determine a second position of the charging plate relative to the collector plate along a second direction that is different from the first direction; and a position controller configured to receive a signal from the sensing array and, based on the signal, to operate the one or more actuators to move the moveable portion of the stand from a stored position in which the charging plate is not aligned with the collector plate to a charging position in which the charging plate is aligned with the collector plate for charging.

12. The retrofit kit of claim 11, wherein the first direction is perpendicular to the second direction, and wherein the first reflective strip extends along the second direction and the second reflective strip extends along the first direction.

13. The retrofit kit of claim 12, wherein the position controller is configured to operate a first actuator of the one or more actuators to move the moveable portion along the second direction to align the first retroreflective sensor with first reflective strip and to operate a second actuator of the one or more actuators to move the moveable portion along the first direction to align the second retroreflective sensor with the second reflective strip.

14. The retrofit kit of claim 11, wherein the sensing array further includes a third sensor to detect a third position of the charging plate relative to the collector plate along a third direction that is different from both the first direction and the second direction.

15. The retrofit kit of claim 14, wherein the third sensor is a position sensor configured to determine a distance between the charging plate and the collector plate.

16. The retrofit kit of claim 14, wherein the position controller is configured to operate a third actuator of the one or more actuators to move the moveable portion along the third direction to align the charging plate with the collector plate.

17. A method for positioning a charging device for charging a battery of a material handling vehicle having a collector plate electrically coupled to the battery, the method comprising:

receiving, using a position controller, a first signal from a first retroreflective sensor indicating a first distance between a charging plate and the collector plate along a first direction, the first retroreflective sensor and the charging plate being supported on a moveable portion of a stand that is configured to be moved relative to a stationary portion of the stand;

operating, using the position controller, a first actuator to move the moveable portion along the first direction to align the first retroreflective sensor with a first reflective strip supported on the material handling vehicle;

receiving, using the position controller, a second signal from a second retroreflective sensor indicating a second distance between the charging plate and the collector plate along a second direction, the second retroreflective sensor being supported on the moveable portion; and operating, using the position controller, a second actuator to move the moveable portion along the second direction to align the second retroreflective sensor with a second reflective strip supported on the material handling vehicle.

18. The method of claim 17, further comprising receiving, using the position controller, a third signal from a position sensor indicating a third distance between the charging plate and the collector plate along a third direction, the position sensor being supported on the moveable portion; and operating, using the position controller, a third actuator to move the moveable portion along the third direction to move the collector plate to be at a predetermined distance from the collector plate for charging.

19. The method of claim 17, further comprising receiving, using a charge controller, a fourth signal from a battery management system of the material handling vehicle, and based on the fourth signal, controlling a flow of electrical energy from the charging plate to the collector plate to charge the battery.

* * * * *